Patented Sept. 18, 1928.

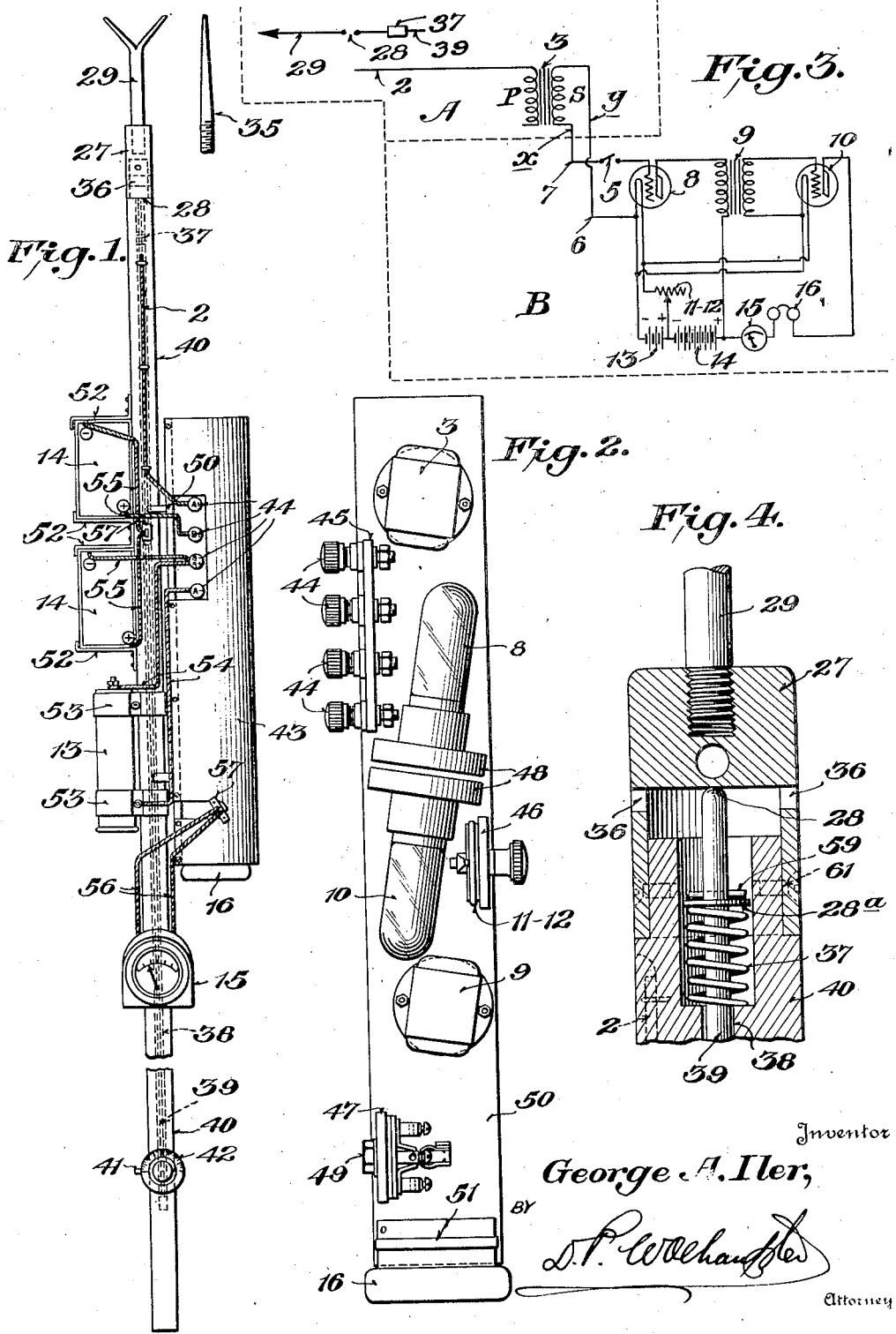

1,684,798

UNITED STATES PATENT OFFICE.

GEORGE A. ILER, OF YOUNGSTOWN, OHIO.

LIVE-LINE AND INSULATOR TESTING DEVICE.

Application filed August 14, 1924. Serial No. 732,071.

This invention relates to electrical testing and testing devices, and more particularly to methods of testing and to testing devices for use in detecting defective units of suspension type insulators, strain type insulators, and pin type insulators under actual service conditions, also locating defects in overhead or underground cables, defects in switchboard panels, electrical defects in street lighting appliances, also in transformer windings, transformer bushings, switch bushings, electrical sparks resulting from commutator brushes, and electrical sparks resulting from either static leaks or power leaks in the windings of electrical apparatus, either while running under load or at rest under voltage.

In the methods of testing for defective insulators on high tension transmission lines used heretofore, it has been necessary to shut down the line during the testing operation, which is troublesome and expensive, or else to short-circuit the connecting ends of each unit of the string of insulators successively, as the testing proceeds, with the possibility always of injuring the operator, or causing a short-circuit which would knock out the line, causing a serious interruption to service. In this latter method, the danger of knocking out the line, due to short-circuiting the only remaining good unit of the string, is so great that preliminary testing of each unit must take place in the effort to discover whether or not it is advisable to actually test the string for defective units. Even such preliminary test is not a sure guide, and it is necessary for the operator to be particularly skilled in the art of testing to be able to obtain any information from the preliminary test. And if the preliminary test discloses the fact that there is probably but one good unit left in the string, in order to prevent injury to the line and possible injury to the operator, it is advisable not to test the string, at least under service conditions, but to wait until the power is cut off the line for some reason, when the suspected defective string is replaced by a good string, and the units of the defective string tested in the laboratory. Again, it is necessary to test the units of the strings in predetermined order to prevent the possibility of knocking out the line and injuring the operator.

In the use of another device that overcomes some of the above difficulties, it is necessary for the operator using the testing device to have an extremely sensitive hearing and be able to hear the faint noise caused by a spark jumping across a minute gap in the circuit and the operator is compelled to hear this very faint noise through a long tube and with his ears covered with a device to which is connected this tube in order to exclude outside noises. Since it is impossible to exclude all outside noises in this way, it becomes extremely difficult to make such tests when there are other noises such as passing trains or automobiles, or the wind blowing through the steel towers or through the lines nearby. Then again, with other devices, it is impossible to get a spark that is loud enough to be heard, even though the operator's ear should be twelve inches from the live line, especially when the line is over-insulated, as is customary in modern practice, this for the reason that the potential gradient or drop across each unit is not sufficient to cause an audible spark, therefore the testing of such insulators must be abandoned entirely, there being no device that will properly test them while alive and in service. My present invention obviates the objections noted above, and enables me to test for defective units of strings of insulators or pin type insulators or strain units while they are in position and the lines operating under load conditions, and also to test the units in any desired order. My invention obviates the objections noted above in that it is an absolutely open circuit method of testing, as this term is generally understood, and the connecting ends of the units are not short circuited at any time during the test, and my invention indicates the potential from each part of the insulating units to ground rather than the potential drop across the units, thereby giving a more accurate indication of the condition of the insulator since the insulator is really intended to insulate the line from the ground instead of insulating the line from the next unit. My invention also obviates the above noted difficulties of hearing the spark since the signals are amplified nearly 400 times by the special device, and at the same time the audible signal is given very loud, there is a visible reading indicated on the special voltmeter, which makes it possible for several different operators to secure the same reading accurately, regardless of their hearing, or of surrounding noises.

Heretofore, in testing apparatus, as at present in use, a serious defect is that the operator is liable to injury from the high tension currents, as the terminals or testing points of the testing devices have been virtually the ends of a conductor which is in the testing operation, completely short-circuited the insulator units, or depend upon a condenser in series with this circuit to normally prevent a short-circuit, which condenser is liable to break down and still cause a short-circuit and serious trouble. I have remedied this difficulty, and have also constructed a testing device which may be used safely under all working conditions, by only using one contact point, thereby making it impossible to touch the live apparatus at more than one place at a time, also making it impossible to short-circuit anything. Another object of my invention, therefore, is the provision of an improved apparatus for safety testing units of electrical insulators and electrical devices as enumerated above, while in actual service.

In the accompanying drawings, illustrating the preferred embodiments of my improved testing apparatus, Figure 1 is a side elevation of the complete live line testing stick ready to work at testing insulators.

Figure 2 is an enlarged elevation of all of the apparatus inside the metal cover.

Figure 3 shows the wiring connections of the testing apparatus in two sections A and B.

Figure 4 is a detailed sectional view taken longitudinally through the front end of the pole.

Similar reference characters designate corresponding parts throughout the several figures of the drawings.

For the purpose of generally explaining the invention it may be pointed out that the apparatus may be conveniently divided into two sections A and B as diagrammatically indicated in Fig. 3. In the diagram referred to the device is intended to be used on the live line testing apparatus and that part shown in zone A is used in connection with the part shown in zone B, the part in zone A being connected with the part in zone B by the wires $x$ and $y$ as indicated at 6 and 7.

By reference to the accompanying drawings it will be observed from Fig. 3 that 2 designates an electrical conductor connected to the primary of a transformer 3. In addition to the transformer 3 an additional transformer 9 is employed, both of said transformers being of the audio frequency amplifying type. A suitable switch 5 is employed in the line leading to the triode tube 8 for opening the circuit in said tube when desired. The points 6 and 7 indicate where the apparatus is connected when using part A in connection with part B.

Ordinary amplifying triode tubes are indicated at 8 and 10. For the purpose of controlling the filament heating current for the triode tubes a suitable rheostat 11, 12 may be employed, the said filament heating current being furnished from battery 13. The plate current for the triode tubes is furnished by another battery 14.

A specially designed voltmeter is designated as 15 while 16 indicates a telephone receiver.

In Fig. 1 the metal ferrule on the end of the test pole is designated as 27 while the variable spark gap is designated as 28, the same being adjustable at all times while the apparatus is in contact with the live line. As previously indicated the sharp spike or forked member at the end of the pole and designated as 29 is placed in contact with the live line insulators and other apparatus.

In making an actual test on an insulator on a live line, it is only necessary to insert the plug 57 which turns on the current in the tubes 8 and 10. Then by applying the steel pointer, either 29 or 35, a signal will be heard coming out of the receiver 16 and a reading will be taken on the meter 15. Then by manipulating the dial 42, which in turn adjusts the spark at 28, a point will be reached on the spark adjustment when no signal is heard, at which time a reading is taken on the dial at 41, which is a stationary pointer, and this reading is intended to be compared with a similar reading under similar conditions, taken on what is known to be a good insulator. This process continues progressively over the test of the insulators on the string. This reading will be indicated on each different insulator, depending upon its location in the string and its physical condition.

Referring more particularly to the important structural characteristics of the improvement, and the functions of the various corelated elements thereof, by reference to the drawings it will be seen that the pole 40 is of hollow construction having therein the bore 38 through which passes the string 39 connecting with the axle of the dial member 42 and also connecting with the electrode member 28 which cooperates with the cap part of the ferrule 27 to provide the spark gap. As shown, the electrode member 28 is the movable element of this spark gap, and it will be understood that the dial element 42 is similar to the conventional dial on a radio set and has the usual axle on which winds the string 39 which pulls against the tension of the spring $28^a$ seated in a housing socket at one end of the pole 40. The spring exerts its pressure against a washer $28^a$ fitted in the movable electrode member 28 so that the spring will normally exert its pressure in a direction to hold the electrode member 28 against the cap of the ferrule 27 as shown in Figures 1 and 4 of the drawings.

The spark occurs between 27 and 28 on Figure 4 of the drawings and is the charging-current which plays across the space between the ferrule cap and the electrode element 28. By moving the dial element 42 the controlling string 39 is either wound up or released very gradually, and this string therefore serves to adjust the spark gap in such a way that by listening to the receiver 16, which is an ordinary telephone receiver, and by observing the meter reading at the meter 15, the operator will be able both to hear and see when the spark starts or stops during the time he is adjusting the dial 42, the sight holes in the ferrule permitting the spark to be seen. At the point the spark ceases, a reading is taken at 41 on the dial 42 since the dial is numbered in the same manner as the ordinary radio dial, and by taking these readings at different times as the test stick prong 29 is applied to the different places on the insulator, a definite reading can be taken from the dial element 42 which will show the various intensities of spark jumping across the spark gap between 27 and 28, and the variation and intensity of the spark determines the condition of the insulator which is under test. In this testing there is no attempt to measure the voltage across the insulator by any process of bridging around it with an instrument to read the impressed voltage across the insulator as is the case with other similar devices. On the contrary the present instrument merely takes the voltage on one side of the insulator and then the voltage on the other side of the insulator, and by mental calculation during this process of testing the approximate difference between the two can be quickly determined.

Referring more particularly to the operation of the indicator 15 this instrument is a mili-ammeter and as shown in diagram B of Figure 3 the said instrument is in series with the telephone receiver 16 and is used to indicate the flow of D. C. current, through the radio tubes 8 and 10. This flow of D. C. current from the battery 14 is in proportion to the amount of grid bias potential impressed on the tubes 8 and 10, which in turn is in proportion to the intensity of the spark at the spark gap. The electrical conductor 2 of diagram A (when the instrument is used as an insulator tester) picks up the radio waves from the spark gap on the test stick, and these signals cause the radio tubes to permit more or less current to flow through the instrument 15, causing a visible signal, and since the telephone receivers are in series with the instrument, a loud audible signal is also received, due to the fact that an amplifying tube 10 is used to increase the visible and audible signals.

In further reference to the feature of the arcing across the gap affecting the antenna, it will be seen by referring to diagram A of Figure 3, that 29 is the prong or contact device that is used in touching the live line or the live insulators that are to be tested. When this is done the spark 28 is adjusted until it stops, the charging current flowing from 29 to 27. The electrical conductor, which is designated by the reference number 2, is insulated from the spark gap and the prong 29, but as shown in Figures 1 and 4, remains in close proximity to the same in order that it will pick up strong electrical disturbances created by the spark at 28.

From the foregoing it will be apparent that the present invention provides a portable live line and insulator testing device comprising a "stick" or handle having thereon a metallic contact 29 for engaging with the live parts of the insulators, or the cement between the units of pin-type insulator. This metallic member or prong 29 is in metallic contact with the cap 27, which latter in turn cooperates with the movable member 28 to provide an adjustable spark gap. In other words, the cap 27 and member 28 constitute spark gap electrodes. When the prong 29 is placed against the part to be tested, it becomes charged with the leaking current and this charge spreads to all other metallic parts close to it and therefore since the cap 27 is on the end of the insulated stick the current will endeavor to jump to the electrode 28 across the gap between the inside wall of 27 and the end of 28. It will of course, be understood that the current tested by this device is usually a 60 cycle high-tension alternating current so that when the metallic prong 29 is placed in the field of leakage, there will be a very rapid but relatively minute sparking between the electrodes 27 and 28.

The result of this sparking is to produce an inductive voltage that is picked up by the electrical conductor 2 which leads to the primary winding of the transformer 3. The lower terminal of the primary of transformer 3 is dead-ended and insulated since the circuit in the antenna and transformer primary merely acts as an impulse circuit, taking a very minute charge as a miniture radio electrical conductor from the sparking produced between the electrodes 27 and 28. Thus, the electrical impulses given out from the spark gap due to the current alternating at 60 times per second, are picked up by the electrical conductor 2 and sent into the primary of the transformer 3. Naturally, these impulses are comparatively weak but they are first amplified by the transformer 3, from the secondary winding of which they then pass through lines $x$ and $y$ into the radio tube 8 where they are again amplified. The impulse or signal then passes through the tube 8 to an amplifying transformer 9 where it is again amplified before passing into the next radio tube 10 for a second stage of amplification. From the radio tube 10 the signal may be heard through the ear phones 16 and also actuates the meter 15, the latter giving a visible indication on the meter scale of the amount of potential resulting from the test. In the diagram, Figure 3, it will, of course, be understood that the radio tubes 8 and 10 are of the filament, grid, and plate type wherein the plate element is energized by the "B" battery 14 while the "A" battery 13 supplies heat to the filaments.

I claim:—

1. A testing device for electrical faults comprising a portable support carrying a contact element, means including said contact element for forming a spark gap, means for adjusting said gap, a pick-up conductor adjacent said gap and a detector circuit connected with said conductor and including means for indicating the presence of the spark at the spark gap.

2. A testing device for electrical faults including a support, spark gap elements on the support, means for adjusting the elements forming the spark gap, a pick-up conductor adjacent said gap and an electrical detector circuit connected with said conductor and including said spark gap and also including means for giving indications of electrical discharges crossing the gap.

3. A testing device for electrical faults including a support, spark gap elements on the support, means for adjusting the elements forming the spark gap, a pick-up conductor adjacent said gap and an electrical detector circuit connected with said conductor and including means for giving visible and audible indications of electrical discharges crossing the gap.

4. A portable device for testing electrical faults including a metal contact element, an adjustable element cooperating with said contact element to provide a variable spark gap, and an electrical detector circuit including a pick-up wire adjacent said gap adapted to receive electrical impulses from the spark gap and a triode vacuum tube, said circuit also including means for giving visible and audible indications of the electrical impulses picked up by said wire.

5. A testing device for electrical faults including a metal contact element for engaging with the electrical part to be tested, an adjustable metal part cooperating with the contact to form a spark gap, means for adjusting said metal part including a scaled dial, and a detector circuit including said spark gap and a pick-up wire spaced therefrom, and said detector circuit also including a triode vacuum tube and electrical means for energizing the same, and visible and audible means for indicating electrical discharges passing across the spark gap.

6. A testing device for electrical faults, said device being free from a ground connection and comprising a support carrying a metal contact element, means cooperating with said metal contact member for forming a spark gap, an electrical detector circuit including a transformer having the primary winding thereof connected with a pick-up wire adjacent the gap and arranged to receive electrical impulses from the spark gap, a triode vacuum tube having the grid thereof connected with the secondary winding of said transformer and the filament thereof being connected with the other end of the secondary winding of said transformer, electrical means for energizing the filament and plate elements of the triode vacuum tube, and visible and audible indicating devices included in circuit with said vacuum tube.

7. A testing device for electrical faults, said device being free from a ground connection and comprising a support carrying a metal contact element, a detector circuit, means cooperating with said metal contact member for forming a spark gap, a pick-up wire adjacent the gap and a triode vacuum tube having the grid and filament elements thereof inductively related to the spark gap through a transformer connected with the pick-up wire, a source of electrical energy for the filament of the triode tube and the plate of said triode tube being included in a circuit with a source of energy and indicating devices.

In testimony whereof I hereunto affix my signature.

GEORGE A. ILER.